US012776258B2

(12) United States Patent
Zhang et al.

(10) Patent No.: US 12,776,258 B2
(45) **Date of Patent: *Oct. 27, 2026**

(54) DISPLAY PANEL AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventors: Huanxi Zhang, Wuhan (CN); Cheng Wang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/195,685

(22) Filed: Apr. 30, 2025

(65) Prior Publication Data

US 2025/0259593 A1 Aug. 14, 2025

Related U.S. Application Data

(63) Continuation of application No. 18/260,131, filed as application No. PCT/CN2023/094047 on May 12, 2023, now Pat. No. 12,293,701.

(30) Foreign Application Priority Data

Apr. 21, 2023 (CN) ........................ 202310439309.X

(51) Int. Cl.
*G09G 3/32* (2016.01)
*G09G 3/3266* (2016.01)

(52) U.S. Cl.
CPC ............. *G09G 3/32* (2013.01); *G09G 3/3266* (2013.01); *G09G 2310/0267* (2013.01); *G09G 2310/08* (2013.01); *G09G 2320/0233* (2013.01)

(58) Field of Classification Search
CPC ...... G09G 3/32; G09G 3/3266; G09G 3/3233; G09G 3/3225; G09G 2310/0267;
(Continued)

(56) References Cited

U.S. PATENT DOCUMENTS

2022/0013618 A1* 1/2022 Park ..................... G09G 3/3233

FOREIGN PATENT DOCUMENTS

CN 105096911 A 11/2015
CN 107705756 A 2/2018
(Continued)

OTHER PUBLICATIONS

International Search Report in International application No. PCT/CN2023/094047,mailed on Jan. 4, 2024.
(Continued)

*Primary Examiner* — Brent D Castiaux
(74) *Attorney, Agent, or Firm* — PV IP PC; Christopher S. Ruprecht; Wei Te Chung

(57) ABSTRACT

A display panel and a display device are provided. The display panel includes a display area and a hole-digging area surrounded by the display area. The display panel includes a plurality of first scanning signal lines. The plurality of first scanning signal lines include a plurality of first type scanning signal lines. Each of the first type scanning signal lines includes a first part, a second part, and a third part. The first part and the second part are respectively located on opposite two sides of the hole-digging area and extend along a first direction. The third part is connected between the first part and the second part. An extension line of the first part passes
(Continued)

through the hole-digging area. A unit length impedance of the third part is greater than a unit length impedance of the first part and a unit length impedance of the second part.

19 Claims, 10 Drawing Sheets

(58) Field of Classification Search
CPC ........ G09G 2310/08; G09G 2320/0233; G09F 9/30; H10K 59/121; H10K 59/131; H10K 59/1213
See application file for complete search history.

(56) References Cited

FOREIGN PATENT DOCUMENTS

| | | | |
|---|---|---|---|
| CN | 110289299 A | | 9/2019 |
| CN | 110780501 A | | 2/2020 |
| CN | 111599852 A | | 8/2020 |
| CN | 111710239 A | | 9/2020 |
| CN | 111710240 A | | 9/2020 |
| CN | 113838399 A | * | 12/2021 |
| CN | 113871427 A | | 12/2021 |
| CN | 113921564 A | | 1/2022 |
| CN | 114616614 A | | 6/2022 |
| CN | 114842746 A | | 8/2022 |
| CN | 115064574 A | | 9/2022 |
| CN | 115101010 A | | 9/2022 |
| CN | 115360227 A | | 11/2022 |
| CN | 115373173 A | | 11/2022 |
| KR | 20110032341 A | | 3/2011 |

OTHER PUBLICATIONS

Written Opinion of the International Search Authority in International application No. PCT/CN2023/094047,mailed on Jan. 4, 2024.
Chinese Office Action issued in corresponding Chinese Patent Application No. 202310439309.X dated Aug. 22, 2025, pp. 1-7.

* cited by examiner (a)

(b)

(c)

DISPLAY PANEL AND DISPLAY DEVICE

CROSS-REFERENCE TO RELATED APPLICATIONS

This application is a continuation application of U.S. patent application Ser. No. 18/260,131, filed on Jun. 30, 2023, which is a US national phase application based upon an International Application No. PCT/CN2023/094047, filed on May 12, 2023, which claims priority to Chinese Patent Application No. 202310439309.X, filed on Apr. 21, 2023. The disclosures of the aforementioned applications are incorporated herein by reference in their entireties.

TECHNICAL FIELD

The present disclosure relates to the field of display technologies, and in particular to a display panel and a display device.

BACKGROUND

With the development of display devices, existing display devices have higher and higher requirements for power consumption and a screen ratio. In order to reduce the power consumption and increase the screen ratio, the existing display devices may adopt low temperature polysilicon oxide (LTPO) technology and O-cut technology. In order to solve a frequency-cutting flicker problem existed in a 7T2C LTPO circuit, an existing display device may adopt an 8T2C circuit. Furthermore, in order to reduce a border of an O-cut area, the existing display device combines a gate controlling signal line with two adjacent rows of signal lines into one wiring to bypass the O-cut area, thereby realizing an electrical connection of the signal lines on both sides of the O-cut area and reducing the border of the O-cut area. However, in actual verification processes, it is found that a load of signal lines in the O-cut area is inconsistent with a load of signal lines in other areas, resulting in uneven display of the display devices, specifically showing a phenomenon of split screen between the O-cut area and the other areas, resulting in poor display.

Therefore, there is a technical problem existed in the existing display device that the load of the signal lines in the O-cut area is inconsistent with the load of the signal lines in other areas, resulting in uneven display.

SUMMARY

A display panel and a display device are provided by the present disclosure to alleviate a technical problem that a load of signal lines in an O-cut area is inconsistent with a load of signal lines in other areas, resulting in uneven display.

In order to solve above problem, technical solutions provided by the present disclosure are as follows.

In a first aspect, a display panel is provided by the present disclosure. The display panel includes a display area and a hole-digging area surrounded by the display area. The display panel includes a plurality of first scanning signal lines. The plurality of first scanning signal lines include a plurality of first type scanning signal lines. Each of the plurality of first type scanning signal lines includes a first part, a second part, and a third part. The first part and the second part are respectively located on opposite two sides of the hole-digging area and extend along a first direction. The third part is connected between the first part and the second part. An extension line of the first part passes through the hole-digging area. A unit length impedance of the third part is greater than a unit length impedance of the first part and a unit length impedance of the second part.

In a second aspect, a display device is provided by the present disclosure. The display device includes the display panel mentioned above.

BRIEF DESCRIPTION OF THE DRAWINGS

The technical solutions, as well as other beneficial advantages, of the present disclosure will be apparent from the following detailed descriptions of embodiments of the present disclosure, with reference to the attached drawings.

DETAILED DESCRIPTION

The present disclosure is described in detail below with reference to the accompanying drawings and specific embodiments. Apparently, the described embodiments are merely a portion of but not all embodiments of the present disclosure. All other embodiments obtained by persons of ordinary skill in the art based on the embodiments of the present disclosure without creative efforts shall fall within a protection scope of the present disclosure.

The embodiments of the present disclosure aim at a technical problem that a load of a signal line in the O-cut area of the existing display device is inconsistent with a load of a signal line in other areas, resulting in uneven display.

Figure 1:
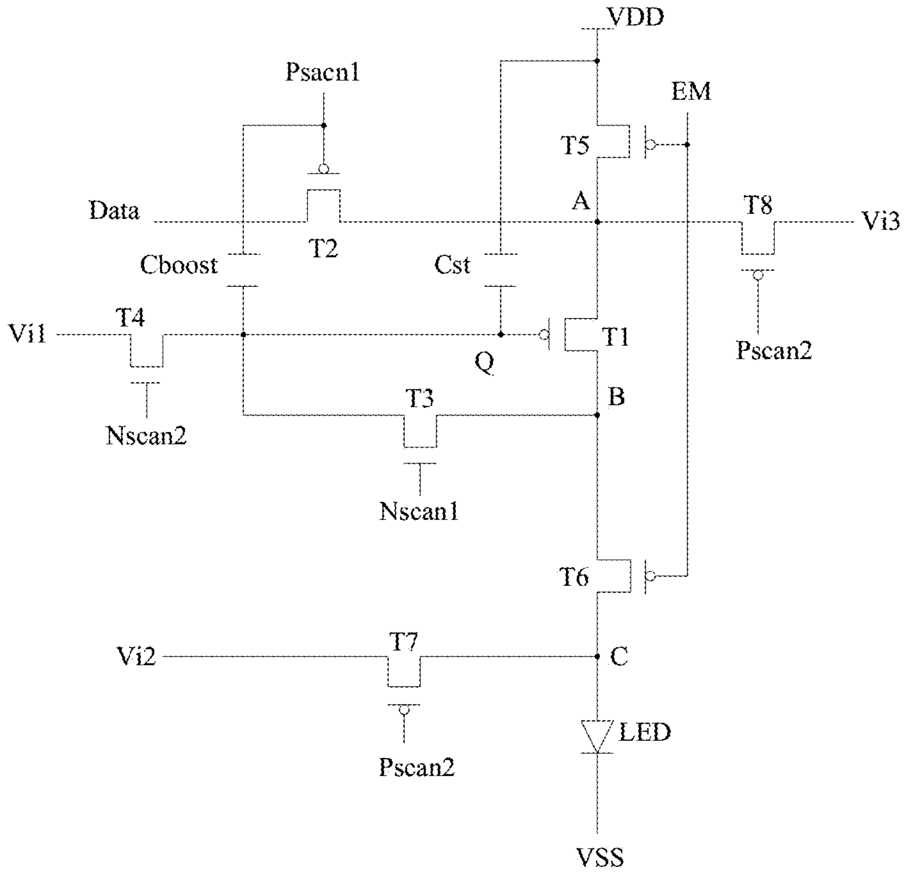
FIG. 1 is a circuit diagram of a display panel provided by embodiments of the present disclosure.
Figure 2:
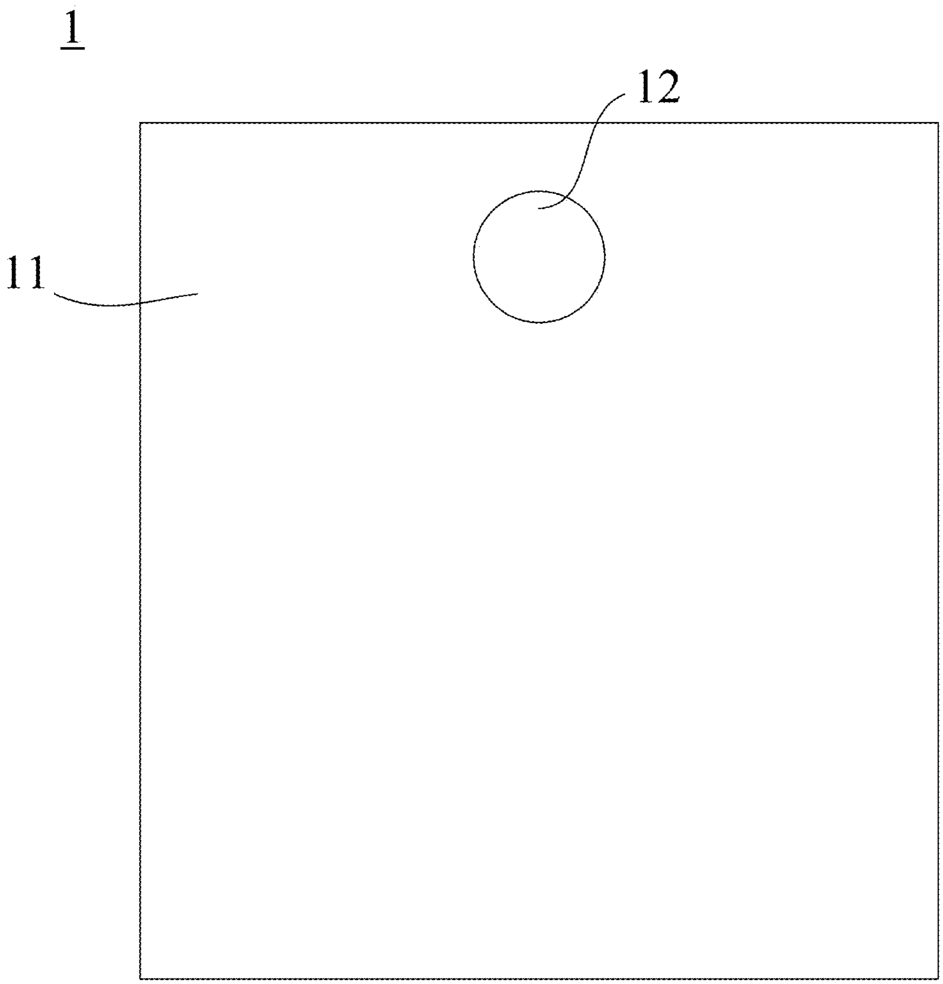
FIG. 2 is a first schematic view of the display panel provided by embodiments of the present disclosure.
Figure 3:
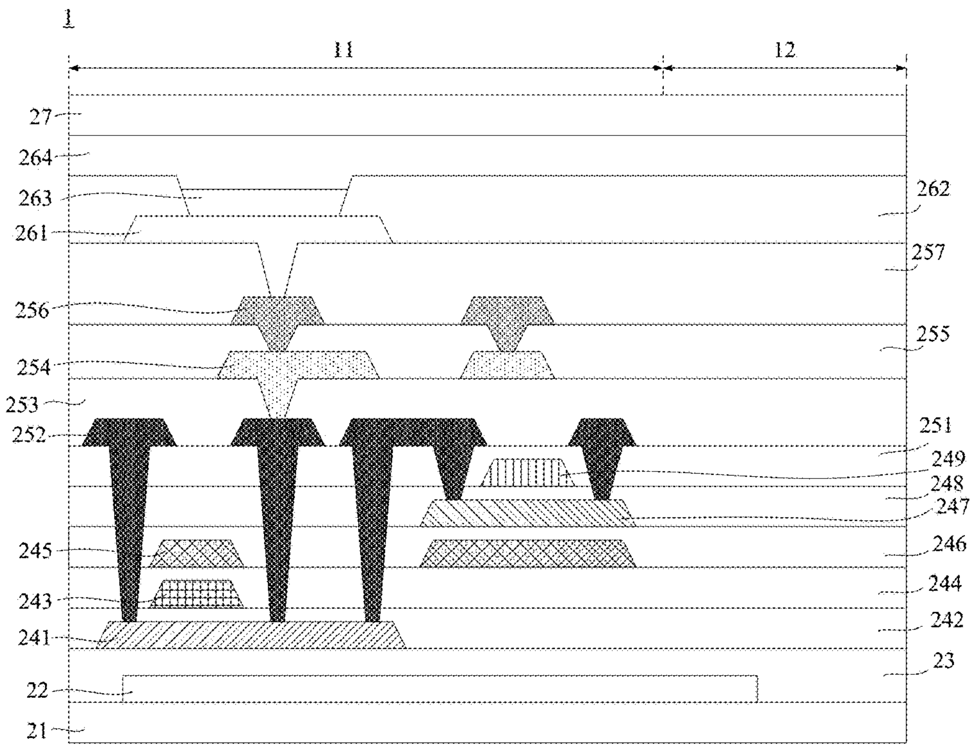
FIG. 3 is a second schematic view of the display panel provided by embodiments of the present disclosure.
Figure 4:
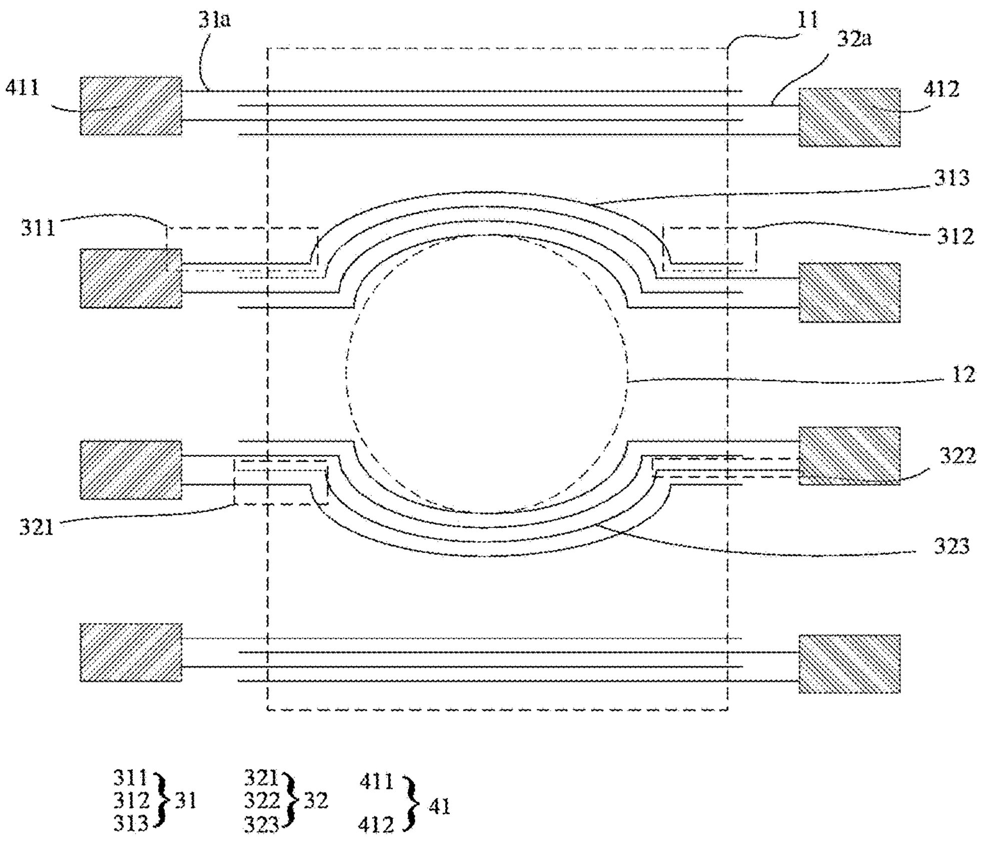
FIG. 4 is a third schematic view of the display panel provided by embodiments of the present disclosure.
Figure 5:
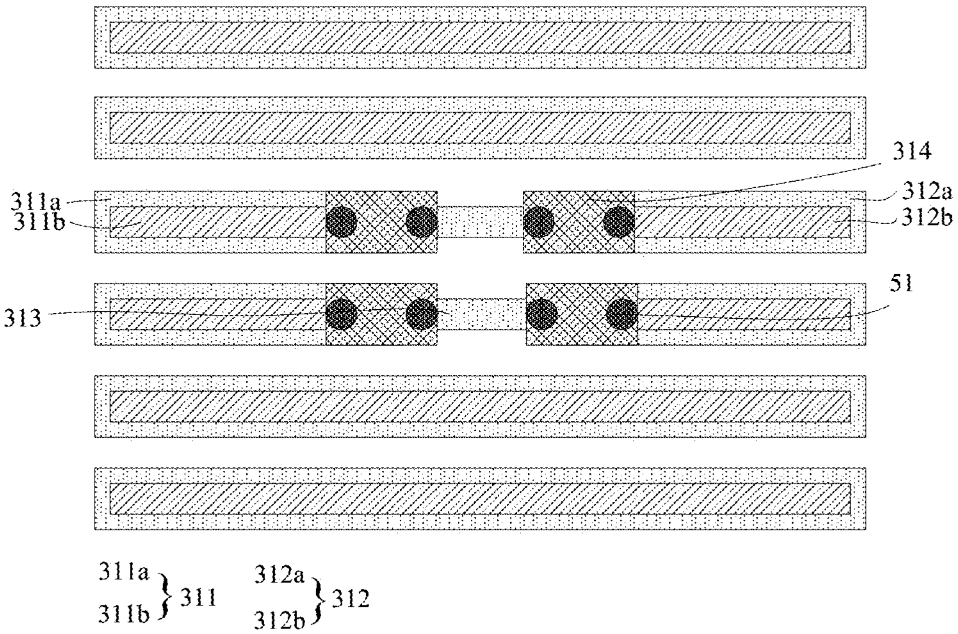
FIG. 5 is a first schematic view of a first scanning signal line provided by embodiments of the present disclosure.
Figure 6:
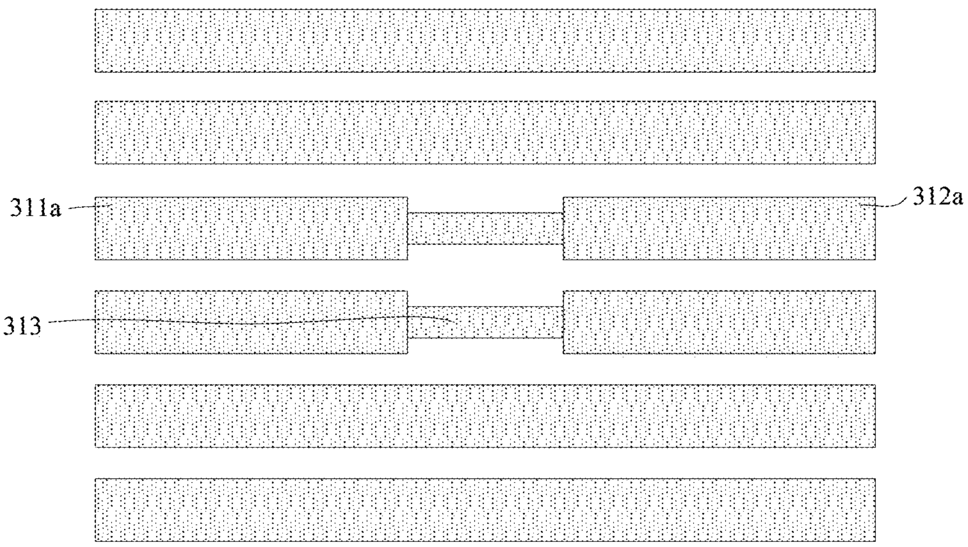
FIG. 6 is an exploded view of the first scanning signal line in FIG. 5.
Figure 6:
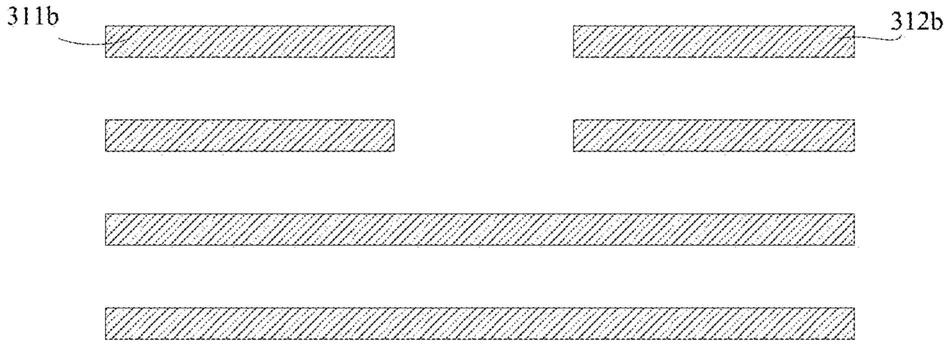
Figure 6:
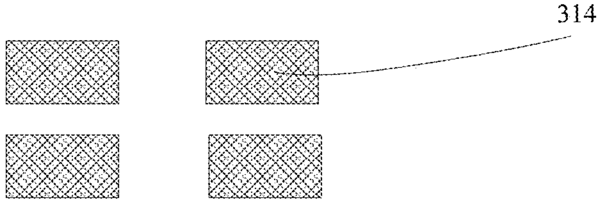
Figure 7:
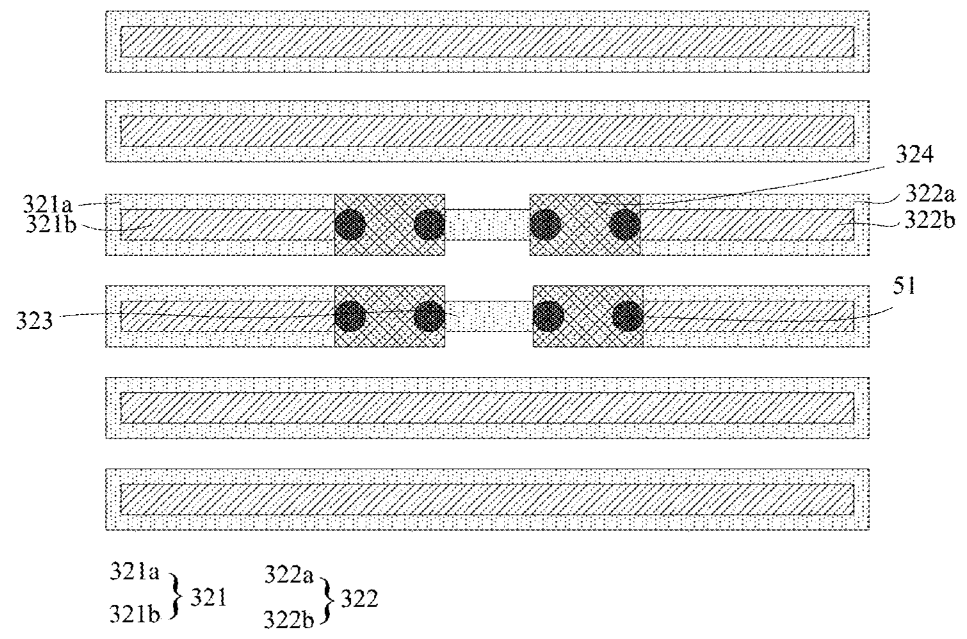
FIG. 7 is a first schematic view of a second scanning signal line provided by embodiments of the present disclosure.
Figure 8:
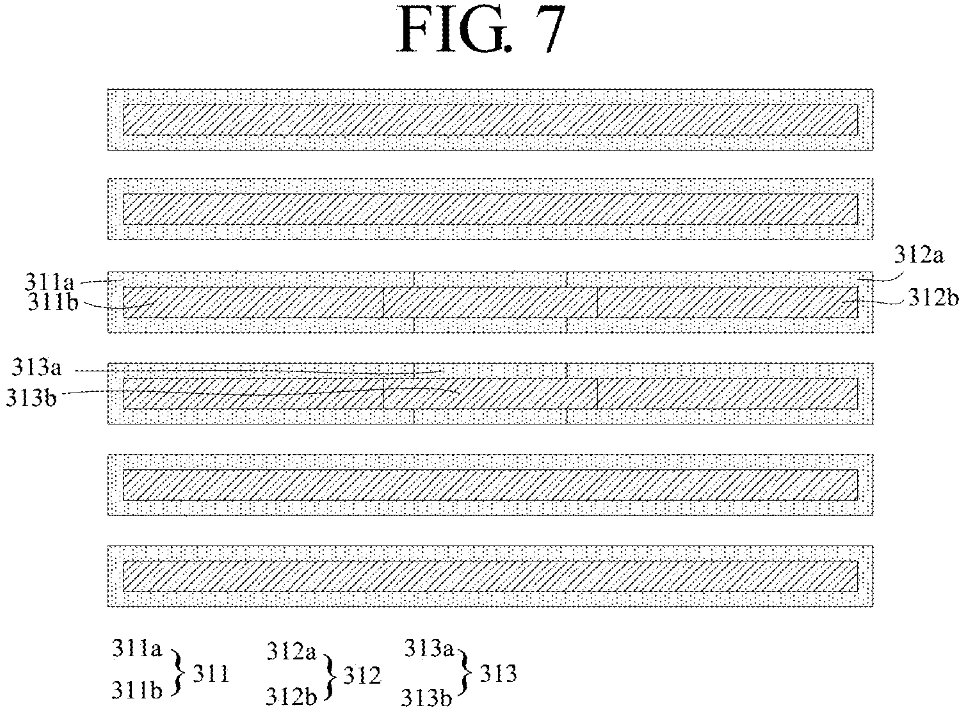
FIG. 8 is a second schematic view of the first scanning signal line provided by embodiments of the present disclosure.
Figure 9:
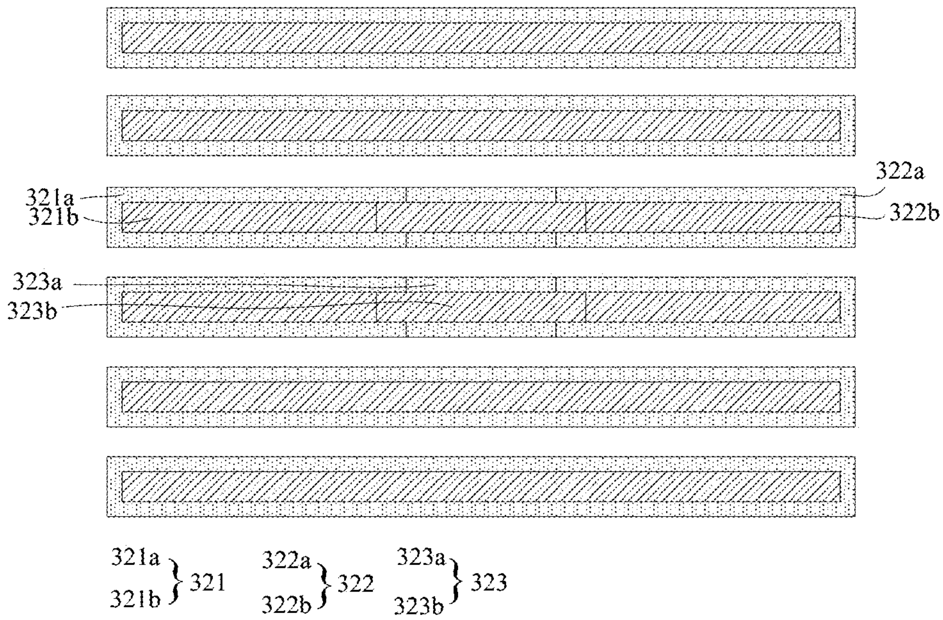
FIG. 9 is a second schematic view of the second scanning signal line provided by embodiments of the present disclosure.
Figure 10:
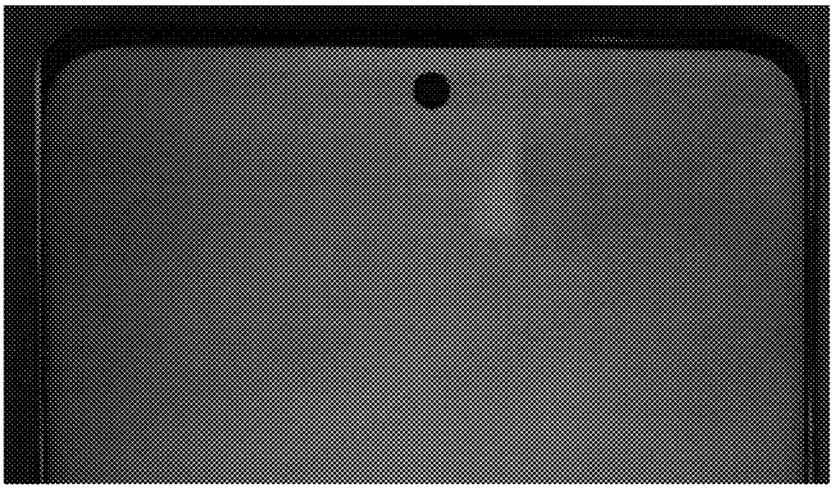
FIG. 10 is a first schematic view of an existing display device.
Figure 11:
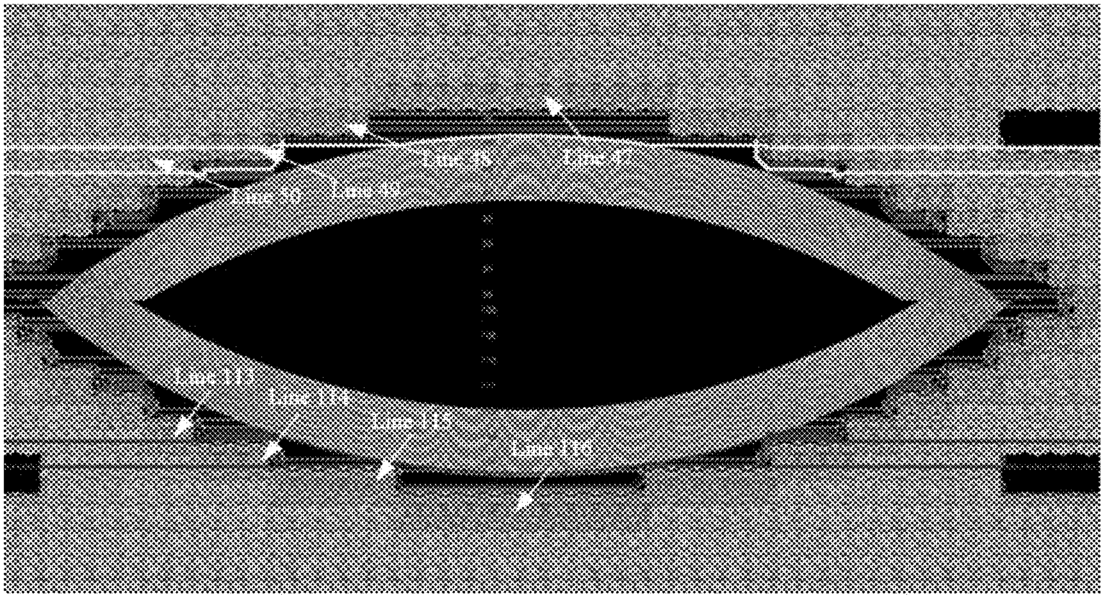
FIG. 11 is a product view of the existing display device.
Figure 12:
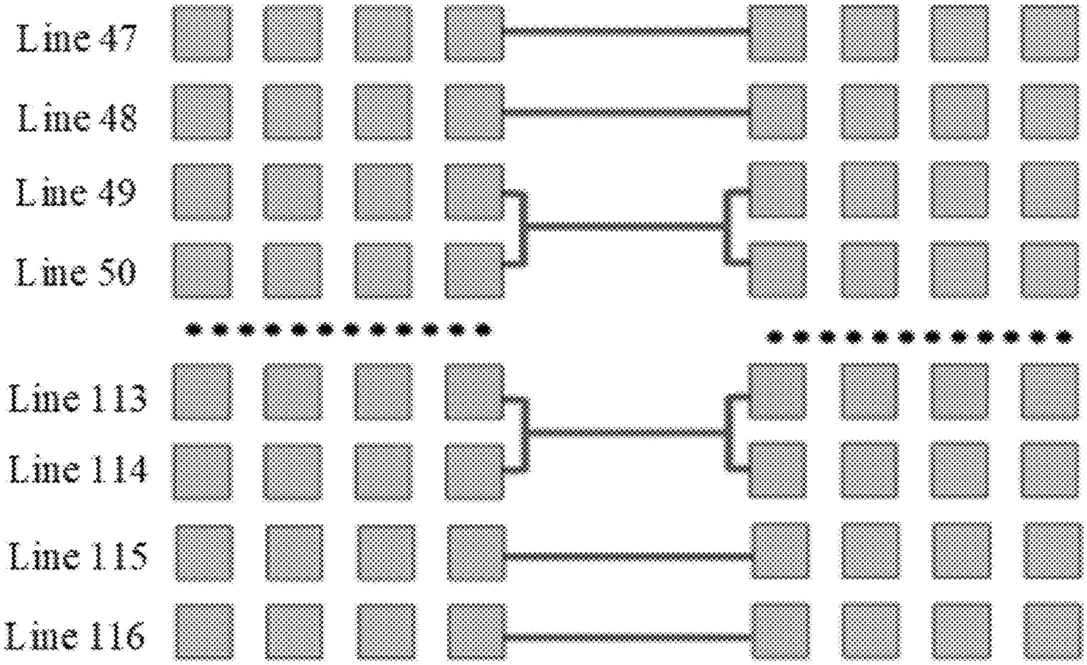
FIG. 12 is a second schematic view of the existing display device.
Figure 13:
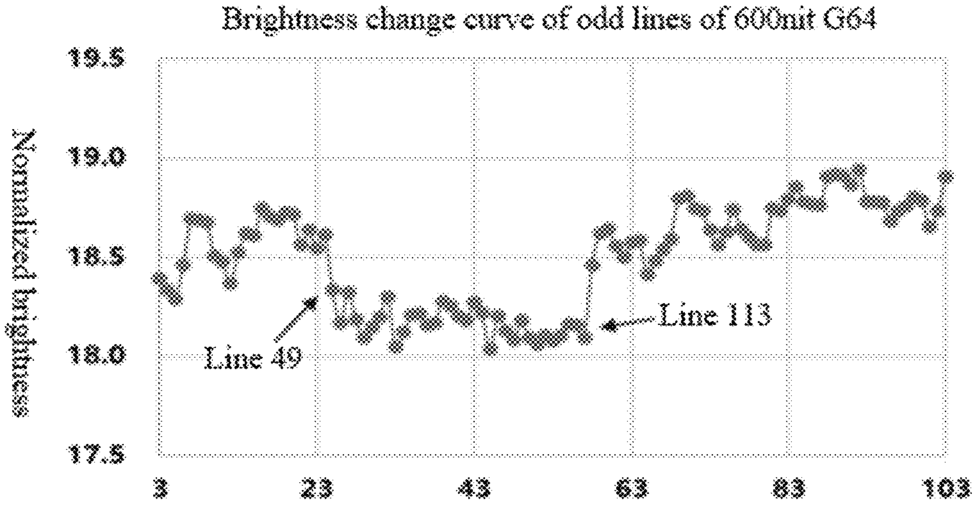
FIG. 13 is a brightness curve diagram of each row of pixels of the existing display device.
Figure 14:
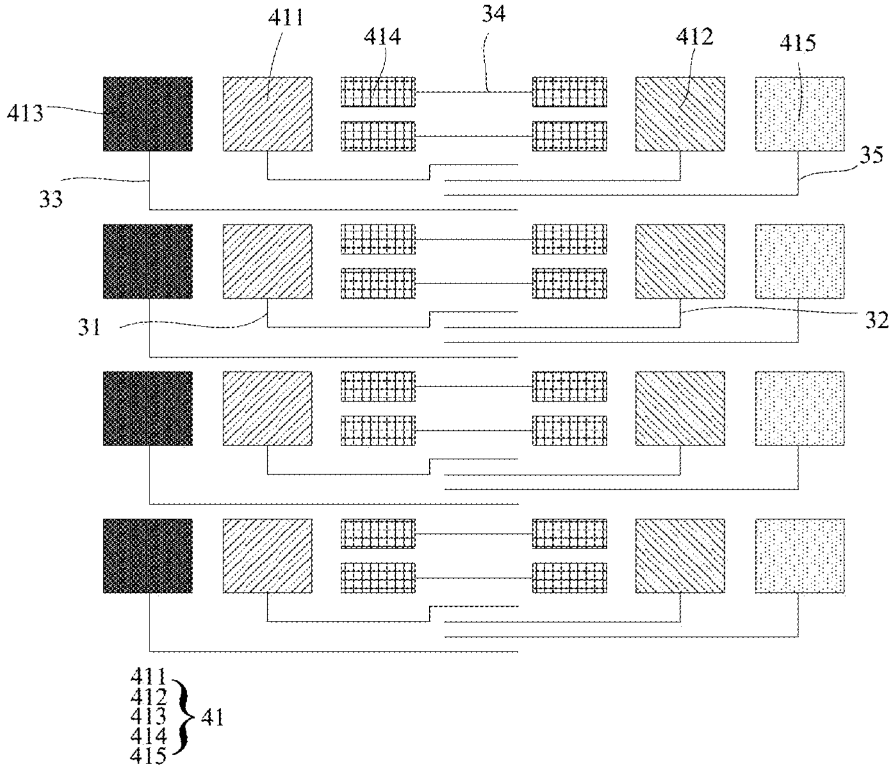
FIG. 14 is a fourth schematic view of the display panel provided by embodiments of the present disclosure.
Figure 15:
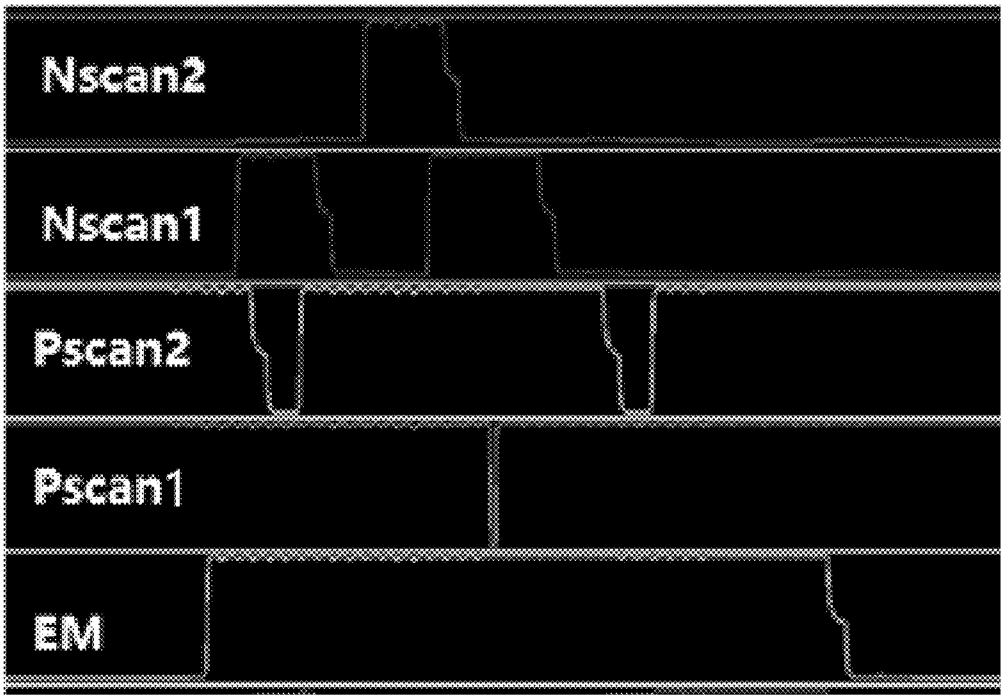
FIG. 15 is a timing diagram of a pixel driving circuit provided by embodiments of the present disclosure.

FIG. 1 is a circuit diagram of a display panel provided by embodiments of the present disclosure. FIG. 2 is a first schematic view of the display panel provided by embodiments of the present disclosure. FIG. 3 is a second schematic view of the display panel provided by embodiments of the present disclosure. FIG. 4 is a third schematic view of the display panel provided by embodiments of the present disclosure. FIG. 5 is a first schematic view of a first scanning signal line provided by embodiments of the present disclosure. (a) in FIG. 6 is an exploded view of a portion of the first scanning signal line located in a first metal layer, and (b) in FIG. 6 is an exploded view of a portion of the first scanning signal line located in a second metal layer. FIG. 7 is a first schematic view of a second scanning signal line provided by embodiments of the present disclosure. FIG. 8 is a second schematic view of the first scanning signal line provided by embodiments of the present disclosure. FIG. 9 is a second schematic view of the second scanning signal line provided by embodiments of the present disclosure. FIG. 10 is a first schematic view of an existing display device. FIG. 11 is a product view of the existing display device. FIG. 12 is a second schematic view of the existing display device. FIG. 13 is a brightness curve diagram of each row of pixels of the existing display device. FIG. 14 is a fourth schematic view of the display panel provided by embodiments of the present disclosure. FIG. 15 is a timing diagram of a pixel driving circuit provided by the embodiments of the present disclosure.

Referring to FIG. 1 to FIG. 4, a display panel 1 is provided by the embodiments of the present disclosure. The display panel 1 includes a display area 11 and a hole-digging area 12. The hole-digging area 12 is surrounded by the display area 11. The display panel 1 includes a plurality of light-emitting devices LED arranged in an array and a pixel driving circuit driving the plurality of light-emitting devices LED. The pixel driving circuit includes a driving transistor T1, a switching transistor T2, a compensation transistor T3, and a first initialization transistor T4.

The switching transistor T2 is connected to the driving transistor T1 at a first node A. The compensation transistor T3 is connected to a first scanning signal line Nscan1. The compensation transistor T3, the driving transistor T1, and a corresponding one of the plurality of light-emitting devices LED are connected at a second node B. The first initialization transistor T4 is connected to a second scanning signal line Nscan2. The first initialization transistor T4, the driving transistor T1, and the compensation transistor T3 are connected at a third node Q.

The display panel 1 includes a plurality of first scanning signal lines and a plurality of second scanning signal lines. The plurality of first scanning signal lines include a plurality of first type scanning signal lines 31 corresponding to the hole-digging area 12 and a plurality of second type scanning signal lines 31*a* corresponding to the display area 11. The plurality of second scanning signal lines include a plurality of third type scanning signal lines 32 corresponding to the hole-digging area 12 and a plurality of fourth type scanning signal lines 32*a* corresponding to the display area 11.

In at least a portion of the first type scanning signal line 31, each includes a first part 311, a second part 312, and a third part 313. The first part 311 is located at a left side of the hole-digging area 12. The second part 312 is located at a right side of the hole-digging area 12. The third part 313 is connected to the first part 311 and the second part 312. An extension line of the first part 31 passes through the hole-digging area 12. And/or, in at least a portion of the third type scanning signal line 32, each includes a fourth part 321, a fifth part 322, and a sixth part 322. The fourth part 321 is located at the left side of the hole-digging area 12. The fifth part 322 is located at the right side of the hole-digging area 12. The sixth part 322 is connected to the fourth part 321 and the fifth part 322. An extension line of the fourth part 321 passes through the hole-digging area 12.

The first part 311 and the second part 312 are respectively located on opposite two sides of the hole-digging area 12 and extend along a first direction. The third part 313 is connected between the first part 311 and the second part 312. The fourth part 321 and the fifth part 322 are respectively located on the opposite two sides of the hole-digging area 12 and extend along the first direction. The sixth part 323 is connected between the fourth part 321 and the fifth part 322.

In the display panel provided by the embodiments of the present disclosure, the first part and the second part of the first type scanning signal line are connected through the third part, so that each first type scanning signal line bypasses the hole-digging area from the left side to the right side of the hole-digging area alone, and an impedance of the first type scanning signal line bypassing the hole-digging area is similar to or even consistent with to an impedance of the second type scanning signal line in other areas. And/or, the fourth part and the fifth part of the third scanning signal line are connected through the sixth part, so that each third type scanning signal line bypasses the hole-digging area from the left side to the right side of the hole-digging area alone, and an impedance of the third type scanning signal line bypassing the hole-digging area is similar to or even consistent with to an impedance of the fourth type scanning signal line in other areas. As such, a load of the hole-digging area is similar or even consistent with a load of other areas, thereby improving display effects.

It should be noted that each structure is described by a circuit diagram and a film schematic diagram respectively in the present disclosure. As such, one same structure may be denoted by different reference numerals. For example, the first scanning signal line may be denoted by reference numeral Nscan1 in the circuit diagram and by 31 and 31*a* in the film diagram. It may be understood that both of the above reference numerals denote the first scanning signal line. Similarly, for other structures existing in the circuit and film structure, reference may also be made to the descriptions of the first scanning signal line, which will not be described in detail in following embodiments.

It should be noted that since the hole-digging area 12 is not provided with wirings, and some pixels are provided on the left sides and the right sides of the hole-digging area. The wirings of pixel rows corresponding to the hole-digging area will bypass the hole-digging area from an upper side or a lower side to realize a normal display of the pixels. Specifically, the extension line of the first part 311 of the first type scanning signal line 31 corresponding to the pixels may pass through the hole-digging area 12. By connecting the first part 311 and the second part 312 of the pixels in one-to-one correspondence through the third part 313, an impedance of the wirings of the pixel rows corresponding to the hole-digging area is similar or even consistent with an impedance of the wirings of pixel rows corresponding to other areas, thereby improving a display uniformity of the display panel. Similarly, for a design of the third type scanning signal line 32, reference may be made to the above descriptions of the first scanning signal line 31.

Specifically, as illustrated in FIG. 10, it may be seen that a phenomenon of split screen exists between the O-cut area and the other areas when displaying. In a current display device, as illustrated in FIG. 11 and FIG. 12, lines 49 to 114 are pixel rows corresponding to the O-cut area. In order to reduce a border of the O-cut area of the current display device, the lines of two adjacent rows of pixels in the pixel rows corresponding to the O-cut area may be connected, and one line is adopted to wind. However, in a verification process of products, as illustrated in FIG. 13, an abscissa in FIG. 13 is a number of rows, an ordinate is a normalized brightness, and the curve is a brightness change curve of odd lines of 600 nit G64 (64th gray scale). It may be seen from FIG. 13, a brightness of lines 49 to 113 is quite different from a brightness of other pixel rows, resulting in uneven display.

Specifically, for the pixel rows corresponding to the hole-digging area, compared with the current display device, after left-side parts of the adjacent two rows of the first scanning signal lines are connected, the left-side parts of the adjacent two rows of the first scanning signal lines are connected to right-side parts of the adjacent two rows of the first scanning signal lines through a same wiring. In the embodiments of the present disclosure, the first part 311 and the second part 312 of each row of the first type scanning signal line are connected through the third part 313, so that the impedance of each row of the first scanning signal line in the display panel is similar or even consistent, thereby improving the display uniformity of the display panel.

Specifically, for the pixel rows corresponding to the hole-digging area, compared with the current display device, after left-side parts of the adjacent two rows of the second scanning signal lines are connected, the left-side parts of the adjacent two rows of the second scanning signal lines are connected to right-side parts of the adjacent two rows of the second scanning signal lines through a same wiring. In the embodiments of the present disclosure, the fourth part 321 and the fifth part 322 of each row of the third type scanning signal line are connected through the sixth part 323, so that the impedance of each row of the second scanning signal line 31 in the display panel is similar or even consistent, thereby improving the display uniformity of the display panel.

In some embodiments, under a condition that the first type scanning signal line includes the first part located at the left side of the hole-digging area, the second part located at the right side of the hole-digging area, and the third part connected to the first part and the second part, and the extension line of the first part passes through the hole-digging area, after the left-side parts of the adjacent two rows of the second scanning signal lines are connected, the left side-parts of the adjacent two rows of the second scanning signal lines are connected to the right-side parts of the adjacent two rows of the first scanning signal lines through the same wiring, so that the impedance of each row of the first scanning signal line in the display panel is similar or even consistent, thereby improving the display uniformity of the display panel. Furthermore, the two adjacent rows of the second scanning signal lines bypass the hole-digging area through the same wiring, so as to reduce the border of the hole-digging area and increase a screen proportion of the display panel.

In some embodiments, under a condition that the third type scanning signal line includes the fourth part located at the left side of the hole-digging area, the fifth part located at the right side of the hole-digging area, and the sixth part connected to the fourth part and the fifth part, and the extension line of the fourth part passes through the hole-digging area, after the left-side parts of the adjacent two rows of the first scanning signal lines are connected, the left-side parts of the adjacent two rows of the first scanning signal lines are connected to the right-side parts of the adjacent two rows of the first scanning signal lines through the same wiring, so that the impedance of each row of the second scanning signal line in the display panel is similar or even consistent, thereby improving the display uniformity of the display panel. Furthermore, the two adjacent rows of the first scanning signal lines bypass the hole-digging area through the same wiring, so as to reduce the border of the hole-digging area and increase the screen proportion of the display panel.

In some embodiments, as illustrated in FIG. 3 to FIG. 5, the display panel 1 includes a substrate 21, a first active layer 241, a first metal layer 243, a second metal layer 245, a second active layer 247, and a third metal layer 249. The first active layer 241 is disposed on a side of the substrate 21. The first metal layer 243 is disposed on a side of the first active layer 241 away from the substrate 21. The second metal layer 245 is disposed on a side of the first metal layer 243 away from the first active layer 241. The second active layer 247 is disposed on a side of the second metal layer 245 away from the first metal layer 241. The third metal layer 249 is disposed on a side of the second active layer 247 away from the second metal layer 245.

The third part 313 is disposed in at least one of the first metal layer 243, the second metal layer 245, and the third metal layer 249. The sixth part 323 is disposed in at least one of the first metal layer 243, the second metal layer 245, and the third metal layer 249. In the present disclosure, with the configuration that the third part is disposed in at least one of the first metal layer, the second metal layer, and the third metal layer, the third part may be connected to the first part and the second part in one-to-one correspondence, the impedance of each first scanning signal line is similar or even consistent, and the uniformity of the display panel is improved. The sixth part is disposed in at least one of the first metal layer, the second metal layer, and the third metal layer, so that the sixth part may be connected to the fourth part and the fifth part in one-to-one correspondence, the impedance of each second scanning signal line is similar or even consistent, and the uniformity of the display panel is improved.

In some embodiments, a unit length impedance of the third part 313 is greater than a unit length impedance of the first part 311 and a unit length impedance of the second part 312.

In some embodiments, a line width of the third part 313 is less than a line width of the first part 311 and a line width of the second part 312.

In some embodiments, the second type scanning signal line 31*a* extends along the first direction, and the line width of the third part 313 is less than a line width of the second type scanning signal line 31*a*.

In some embodiments, a unit length impedance of the six part 323 is greater than a unit length impedance of the fourth part 321 and a unit length impedance of the fifth part 322.

In some embodiments, a line width of the sixth part 323 is less than a line width of the fourth part 321 and a line width of the fifth part 322.

In some embodiments, the fourth type scanning signal line 32*a* extends along the first direction, and the line width of the fourth part 323 is less than the line width of the fourth type scanning signal line 32*a*.

In some embodiments, as illustrated in FIG. 5 and FIG. 6, the first part 311 includes a first sub-part 311*a* and a second sub-part 311*b* located in respective metal layers. The second part 312 includes a third sub-part 312*a* disposed in a same layer as the first sub-part 311*a* and a fourth sub-part 312*b* disposed in a same layer as the second sub-part 311*b*. The first sub-part 311*a* and the second sub-part 311*b* are connected to the third sub-part 312*a* and the fourth sub-part 312*b* through the third part 313. With the configuration that the first part includes the first sub-part and the second sub-part located in respective metal layers, the second part includes the third sub-part disposed in the same layer as the first sub-part and the fourth sub-part disposed in the same layer as the second sub-part, and the first sub-part and the second sub-part are connected to the third sub-part and the fourth sub-part through the third part, so that the first scanning signal line may control two gates of the compensation transistor to improve a control capability of the compensation transistor. And the third part is connected to the first sub-part, the second sub-part, the third sub-part, and the fourth sub-part, so that the first scanning signal line may control the compensation transistor in one row of pixels.

Specifically, as illustrated in FIG. 3, FIG. 5, and FIG. 6, taking the first sub-part 311*a* is disposed in the first metal layer 243 and the second sub-part 311*b* is disposed in the second metal layer 245 as an example. The first sub-part 311*a* may be connected to a bottom gate of the compensation transistor, and the second sub-part 311*b* may be connected to a top gate of the compensation transistor, so as to control the compensation transistor.

Specifically, the first sub-part 311*a*, the second sub-part 311*b*, the third sub-part 312*a*, and the fourth sub-part 312*b* are connected through the third part, so that a potential of each part of the first scanning signal line is consistent.

In view of the technical problem that an impedance of signal lines in the O-cut area of the existing display device is inconsistent with an impedance of signal lines in other areas, resulting in uneven display. In some embodiments, as illustrated in FIG. 4 to FIG. 6, the third part 313 and one of the first sub-part 311*a* and the second sub-part 311*b* are disposed in a same layer. At a junction of the hole-digging area 12 and the display area 11, the first sub-part 311*a* is connected to the second sub-part 311*b*, the third sub-part 312*a* is connected to the fourth sub-part 312*b*, and the first sub-part 311*a* is connected to the third sub-part 312*a* through the third part 313. With the configuration that the first sub-part is connected to the second sub-part, the third sub-part is connected to the fourth sub-part, and the first sub-part is connected to the third sub-part through the third part, when the first scanning signal line bypasses the hole-digging area, each part of the first scanning signal line may be connected together, so that the potential of each part is consistent. The third part is disposed in the same layer as one of the first sub-part and the second sub-part, so that the third part merely occupies one layer of metal, thereby reducing the border of the hole-digging area and improving the screen proportion of the display panel.

Specifically, when the sub-parts of different layers are connected, the sub-parts may be connected by connecting wires of other layers. As illustrated in FIG. 5, joints of different metal layers are denoted by reference number 51. For example, under a condition that the first sub-part 311*a* is disposed in the first metal layer, the second sub-part 311*b* is disposed in the second metal layer, and the third part 313 is disposed in the first metal layer, the third part 313 may be directly connected to the first sub-part 311*a*. Furthermore, first connecting parts 314 are provided, so that the first connecting parts 314 is connected to the third part 313 through one via hole, and the first connecting parts 314 is connected to the second sub-part 311*b* through another via hole. However, the embodiments of the present disclosure are not limited to this, for example, the connecting parts 314 connect the first sub-part, the second sub-part, and the third part through via holes, respectively. For example, without providing the connecting parts, the first sub-part 311*a* is disposed in the first metal layer, the second sub-part 311*b* is disposed in the second metal layer, and the third part 313 is disposed in the second metal layer, so that the second sub-part 311*b* is connected to the first sub-part 311*a* through one via hole, the fourth sub-part 312*b* is connected to the third sub-part 312*a* through another via hole, and the third part 313 is connected to the first sub-part 311*a* and the third sub-part 312*a* through yet another via hole. For example, without providing the connecting parts, the third part is directly connected to the second sub-part and the fourth sub-part, the second sub-part is directly connected to the first sub-part through one via hole, and the fourth sub-part is directly connected to the third sub-part through another via hole, so that the number of the via holes is reduced, a preparation efficiency of the display panel is improved, and the impedance of the first scanning signal line is reduced. For connection ways of other sub-parts or other parts, reference can be made to connection ways of the first sub-part and the second sub-part, as well as connection ways of the third sub-part and the first sub-part mentioned above, which will not be repeated in the following embodiments.

Specifically, the first connecting parts may be disposed in a first source/drain layer.

In some embodiments, the line width of the third part 313 is less than a line width of the first sub-part 311*a* and the second sub-part 311*b* disposed in the same layer as the third part 313, and the line width of the third part 313 is less than a line width of the third sub-part 312*a* and the fourth sub-part 312*b* disposed in the same layer as the third part 313.

Specifically, in order to distinguish the third part from other sub-parts, FIG. 5 illustrates that a line width of the third part is less than a line width of the other sub-parts of the present disclosure.

In some embodiments, the third part is disposed in the first metal layer, or the third part is disposed in the second metal layer, or the third part is disposed in the third metal layer.

Specifically, under a condition that the third part is disposed in the first metal layer, one of the first sub-part and the second sub-part may be disposed in the first metal layer, and the first sub-part may be disposed in the second metal layer, and the second sub-part may be disposed in the third metal layer. Similarly, under a condition that the third part is disposed in the second metal layer or the third metal layer, one of the first sub-part and the second sub-part may be disposed in the same layer as the third part, or the first sub-part and the second sub-part may be disposed in different layers from the third part.

Specifically, since the bottom gate of the compensation transistor is disposed in the second metal layer, and the top gate of the compensation transistor is disposed in the third metal layer, the first sub-part may be disposed in the second metal layer and the second sub-part may be disposed in the third metal layer, so that the first sub-part is directly connected to the bottom gate and the second sub-part is directly connected to the top gate.

Specifically, under a condition that the third part is disposed the same layer as one of the first sub-part and the second sub-part, e.g., the third part and the second sub-part are disposed in the same layer, the second sub-part, the third part, and the fourth sub-part may be formed simultaneously without etching metal wrings to form the second sub-part, the third part, and the fourth sub-part, respectively, thereby improving the preparation efficiency of the display panel.

Specifically, FIG. 5, FIG. 7, FIG. 8, and FIG. 9 show that there are joints or boundaries between the parts or the sub-parts to distinguish different parts conveniently. However, it may be understood that when the parts or the sub-parts are disposed in the same layer, there may be no joints or boundaries between the parts or sub-parts. For example, if the first sub-part 311*a* and the third part 313 are disposed in the same layer, the first sub-part 311*a* and the third part 313 are two parts of the same metal wiring, and there is no need to provide the joints or the boundaries. Similarly, for other parts and other sub-parts, there may be no joints or boundaries.

In view of a problem still existing that the impedance of the first sub-part and the second sub-part connected to the same wring is inconsistent with the impedance of the signal lines in other areas. In some embodiments, as illustrated in FIG. 8, the third part 313 includes a fifth sub-part 313*a* disposed in a same layer as the first sub-part 311*a* and a sixth sub-part 313*b* disposed in a same layer as the second sub-part 311*b*. The first sub-part 311*a* is connected to the third sub-part 312*a* through the fifth sub-part 313*a*. The second sub-part 311*b* is connected to the fourth sub-part 312*b* through the sixth sub-part 313*b*. With the configuration that the third part includes the fifth sub-part and the sixth sub-part, the first sub-part is connected to the third sub-part through the fifth sub-part, and the second sub-part is connected to the fourth sub-part through the sixth sub-part, each layer of the first scanning signal lines bypasses the hole-digging area separately, and the first scanning signal line corresponding to the hole-digging area and the first scanning signal line in the other areas are connected one by one, so that the impedance of the first scanning signal line corresponding to the hole-digging area is similar or even consistent with the impedance of the first scanning signal line in the other areas, thereby improving a yield of the display panel.

In some embodiments, a line width of the fifth sub-part 313*a* and a line width of the sixth sub-part 313*b* are less than the line width of the first sub-part 311*a* and the line width of the third sub-part 311*b*.

In some embodiments, the fifth sub-part is disposed in the first metal layer, and the sixth sub-part is disposed in the second metal layer. Or the fifth sub-part is disposed in the first metal layer, and the sixth sub-part is disposed in the third metal layer. Or the fifth sub-part is disposed in the second metal layer, and the sixth sub-part is disposed in the third metal layer.

Specifically, under the condition that the fifth sub-part and the sixth sub-part are provided, the fifth sub-part may be disposed in one of the first metal layer, the second metal layer, and the third metal layer, and the sixth sub-part may be disposed in the other of the first metal layer, the second metal layer, and the third metal layer. Correspondingly, the first sub-part may be disposed in the same layer as the fifth sub-part, and the second sub-part may be disposed in the same layer as the sixth sub-part, thereby reducing process steps of the display panel and improving the preparation efficiency of the display panel.

In some embodiments, a projection of the fifth sub-part on the substrate does not overlap a projection of the sixth sub-part on the substrate.

In some embodiments, a projection of the first sub-part on the substrate does not overlap a projection of the second sub-part on the substrate.

In some embodiments, a projection of the third sub-part on the substrate does not overlap a projection of the fourth sub-part on the substrate.

In view of a problem that the fifth sub-part does not overlap the sixth sub-part, resulting in a larger border of the display panel. In some embodiments, the projection of the fifth sub-part on the substrate overlaps with the projection of the sixth sub-part on the substrate. With the configuration that the projection of the fifth sub-part on the substrate overlaps the projection of the sixth sub-part on the substrate, so that a space occupied by the fifth sub-part and the sixth sub-part is small, thereby avoiding increasing the border of the hole-digging area and improving the display effects.

Specifically, the projection of the fifth sub-part on the substrate coincides with the projection of the sixth sub-part on the substrate.

Specifically, the projection of the first sub-part on the substrate overlaps the projection of the second sub-part on the substrate, and the projection of the third sub-part on the substrate overlaps the projection of the fourth sub-part on the substrate, so that a space occupied by each first scanning signal line is small, a resolution of the display panel is improved, and the screen proportion of the display panel is improved.

In some embodiments, referring to FIG. 9, the fourth part 321 includes a seventh sub-part 321*a* and an eighth sub-part 321*b* located in respective metal layers. The fifth part 322 includes a ninth sub-part 322*a* disposed in a same layer as the seventh sub-part 321*a* and a tenth sub-part 322*b* disposed in a same layer as the eighth sub-part 321*b*. The seventh sub-part 321*a* and the eighth sub-part 321*b* are connected to the ninth sub-part 322*a* and the tenth sub-part 322*b* through the sixth part. With the configuration that the fourth part includes the seventh sub-part and the eighth sub-part located in respective metal layers. The fifth part includes the ninth sub-part disposed in the same layer as the seventh sub-part and the tenth sub-part disposed in the same layer as the eighth sub-part, so that the second scanning signal line may control two gates of the first initialization transistor to improve a control capability of the first initialization transistor. And the sixth part is connected to the seventh sub-part, the eighth sub-part, the ninth sub-part, and the tenth sub-part, so that the second scanning signal line may control the first initialization transistor in one row of pixels.

In some embodiments, the line width of the sixth part 323 is less than a line width of the seventh sub-part 321*a* and the eighth sub-part 321*b* disposed in the same layer as the sixth part 323, and the line width of the sixth part 323 is less than a line width of the ninth sub-part 322*a* and the tenth sub-part 322*b* disposed in the same layer as the third part 323.

Specifically, as illustrated in FIG. 3 and FIG. 7, taking the seventh sub-part 321*a* is disposed in the first metal layer 243 and the eighth sub-part 321*b* is disposed in the second metal layer 245 as an example. The seventh sub-part 321*a* may be connected to a bottom gate of the first initialization transistor, and the eighth sub-part 321*b* may be connected to a top gate of the first initialization transistor, thereby controlling the first initialization transistor.

Specifically, the seventh sub-part 321*a*, the eighth sub-part 321*b*, the ninth sub-part 322*a*, and the tenth sub-part 322*b* are connected through the sixth part, so that a potential of each part of the second scanning signal line is consistent.

In view of the technical problem that the impedance of the signal lines in the O-cut area is inconsistent with the impedance of the signal lines in the other areas, resulting in uneven display. In some embodiments, as illustrated in FIG. 4 and FIG. 7, the sixth part 323 and one of the seventh sub-part 321*a* and the eighth sub-part 321*b* are disposed in a same layer. At the junction of the hole-digging area 12 and the display area 11, the seventh sub-part 321*a* is connected to the eighth sub-part 321*b*, the ninth sub-part 322*a* is connected to the tenth sub-part 322*b*, and the seventh sub-part 321*a* is connected to the ninth sub-part 322*a* through the sixth part 323. With the configuration that the seventh sub-part is connected to the eighth sub-part, the ninth sub-part is connected to the tenth sub-part, and the seventh sub-part is connected to the ninth sub-part through the sixth part, when the second scanning signal line bypasses the hole-digging area, each part of the second scanning signal line may be connected together, so that the potential of each part is consistent. The sixth part is disposed in the same layer as one of the seventh sub-part and the eighth sub-part, so the sixth part merely occupies one layer of metal, thereby reducing the border of the hole-digging area and improving the screen proportion of the display panel.

Specifically, when the sub-parts of different layers are connected, the sub-parts may be connected by the connecting wires of other layers. As illustrated in FIG. 7, for example, under a condition that the seventh sub-part 321*a* is disposed in the first metal layer, the eighth sub-part 321*b* is disposed in the second metal layer, and the sixth part 323 is disposed in the first metal layer, the sixth part 323 may be directly connected to the seventh sub-part 321*a*. Furthermore, second connecting parts 324 are provided, so that the second connecting parts 324 is connected to the sixth part 323 through one via hole, and the second connecting parts 324 is connected to the eighth sub-part 321*b* through another via hole. However, the embodiments of the present disclosure are not limited to this, for example, the connecting parts 324 is connected to the seventh sub-part, the eighth sub-part, and the sixth part through the via holes, respectively. For example, without providing the connecting parts, the seventh sub-part 321*a* is disposed in the first metal layer, the eighth sub-part 321*b* is disposed in the second metal layer, and the sixth part 313 is disposed in the second metal layer, the eighth sub-part 321*b* is connected to the seventh sub-part 321*a* through one via hole, the tenth sub-part 322*b* is connected to the ninth sub-part 322*a* through another via hole, and the sixth part 323 is connected to the seventh sub-part 321*a* and the ninth sub-part 312*a* through yet another via hole. For example, without providing the connecting parts, the sixth part is directly connected to the seventh sub-part and the eighth sub-part, the eighth sub-part is directly connected to the seventh sub-part through one via hole, and the tenth sub-part is directly connected to the ninth sub-part through another via hole, so that the number of the via holes is reduced, the preparation efficiency of the display panel is improved, and the impedance of the first scanning signal line is reduced.

Specifically, the second connecting parts may be disposed in the first source/drain layer.

Specifically, in order to distinguish the sixth part from the other sub-parts, FIG. 7 illustrates that a line width of the sixth part is less than a line width of the other sub-parts of present disclosure.

In some embodiments, the sixth part is disposed in the first metal layer, or the sixth part is disposed in the second metal layer, or the sixth part is disposed in the third metal layer.

Specifically, under a condition that the sixth part is disposed in the first metal layer, one of the seventh sub-part and the eighth sub-part may be disposed in the first metal layer, the seventh sub-part may be disposed in the second metal layer, and the eighth sub-part may be disposed in the third metal layer. Similarly, under a condition that the sixth part is disposed in the second metal layer or the third metal layer, one of the first sub-part and the second sub-part may be disposed in the same layer as the sixth part, or the seventh sub-part and the eighth sub-part may be disposed in different layers from the sixth part.

Specifically, since the bottom gate is disposed in the second metal layer and the top gate of the first initialization transistor is disposed in the third metal layer, the seventh sub-part may be disposed in the second metal layer and the eighth sub-part may be disposed in the third metal layer, so that the seventh sub-part is directly connected to the bottom gate and the eighth sub-part is directly connected to the top gate.

Specifically, under a condition that the sixth part is disposed the same layer as one of the seventh sub-part and the eighth sub-part, e.g., the sixth part and the seventh sub-part are disposed in the same layer, the seventh sub-part, the sixth part, and the ninth sub-part may be formed simultaneously without etching the metal wrings to form the seventh sub-part, the sixth part, and the ninth sub-part, respectively, thereby improving the preparation efficiency of the display panel.

In view of a problem still existing that an impedance of the seventh sub-part and the eighth sub-part connected to the same wring is inconsistent with the impedance of the signal lines in the other areas. In some embodiments, as illustrated in FIG. 9, the sixth part 323 includes an eleventh sub-part 323*a* disposed in a same layer as the seventh sub-part 321*a* and a twelfth sub-part 323*b* disposed in a same layer as the eighth sub-part 321*b*. The seventh sub-part 321*a* is connected to the ninth sub-part 322*a* through the eleventh sub-part 323*a*, and the eighth sub-part 321*b* is connected to the tenth sub-part 323*b* through the twelfth sub-part 322*b*. With the configuration that the sixth part includes the eleventh sub-part and the twelfth sub-part, the seventh sub-part is connected to the ninth sub-part through the eleventh sub-part, and the eighth sub-part is connected to the tenth sub-part through the twelfth sub-part, each layer of the second scanning signal line is wound from the hole-digging area separately, and the second scanning signal line corresponding to the hole-digging area and the second scanning signal line in the other areas are connected one by one, so that the impedance of the second scanning signal line corresponding to the hole-digging area is similar or even consistent with the impedance of the second scanning signal line in the other areas, thereby improving the yield of the display panel.

In some embodiments, a line width of the eleventh sub-part 323*a* and a line width of the twelfth sub-part 323*b* are less than the line width of the seventh sub-part 321*a* and the line width of the ninth sub-part 322*a*.

In some embodiments, the eleventh sub-part is disposed in the first metal layer, and the twelfth sub-part is disposed in the second metal layer. Or the eleventh sub-part is disposed in the first metal layer, and the twelfth sub-part is disposed in the third metal layer. Or the eleventh sub-part is disposed in the second metal layer, and the twelfth sub-part is disposed in the third metal layer.

Specifically, when the eleventh sub-part and the twelfth sub-part are provided, the eleventh sub-part may be disposed in one layer of the first metal layer, the second metal layer, and the third metal layer, and the twelfth sub-part may be disposed in another layer of the first metal layer, the second metal layer, and the third metal layer. Correspondingly, the seventh sub-part may be disposed in the same layer as the eleventh sub-part, and the eighth sub-part may be disposed in the same layer as the twelfth sub-part, thereby reducing the process steps of the display panel and improving the preparation efficiency of the display panel.

In some embodiments, a projection of the eleventh sub-part on the substrate does not overlap a projection of the twelfth sub-part on the substrate.

In some embodiments, a projection of the seventh sub-part on the substrate does not overlap a projection of the eighth sub-part on the substrate.

In some embodiments, a projection of the ninth sub-part on the substrate does not overlap a projection of the tenth sub-part on the substrate.

In view of a problem that the eleventh sub-part does not overlap the twelfth sub-part, resulting in a larger border of the display panel. In some embodiments, the projection of the eleventh sub-part on the substrate overlaps the projection of the twelfth sub-part on the substrate. With the configuration that the projection of the eleventh sub-part on the substrate overlaps the projection of the twelfth sub-part on the substrate, so that a space occupied by the eleventh sub-part and the twelfth sub-part is small, thereby avoiding increasing the border of the hole-digging area and improving the display effects.

Specifically, the projection of the eleventh sub-part on the substrate coincides with the projection of the twelfth sub-part on the substrate.

Specifically, the projection of the seventh sub-part on the substrate overlaps the projection of the eighth sub-part on the substrate, and the projection of the ninth sub-part on the substrate overlaps the projection of the tenth sub-part on the substrate, so that a space occupied by each second scanning signal line is small, the resolution of the display panel is improved, and the screen proportion of the display panel is improved.

In view of a problem that each scanning signal line is separately connected to gate driving units, resulting in a large border of the display panel. In some embodiments, referring to FIG. 4, the display panel further includes gate driving units 41. The gate driving units 41 include first gate driving units 411 and second gate driving units 412 arranged the opposite two sides of the display area 11. Two adjacent rows of first scanning signal lines are connected to a same one of the first gate driving units 411, and two adjacent rows of the second scanning signal lines are connected to a same one of the second gate driving units 412. With the configuration that the two adjacent rows of first scanning signal lines are connected to the same one of the first gate driving units, and the two adjacent rows of the second scanning signal lines are connected to the same one of the second gate driving units 412, a space occupied by the gate driving units may be reduced and the border of the display panel may be reduced.

Specifically, taking the display panel as an organic light-emitting diode (OLED) display panel, the display screen is 600 nits and the 64th gray scale, and taking three different pixels connected by the first scanning signal line corresponding to the hole-digging area as an example, a current of the current display device is compared with a current of the display panel of the embodiments of the present disclosure, and a distance between the three pixels and the first gate driving units may be 0, ½ of a width of the display area, and the width of the display area, respectively.

Specifically, the solution of the current display device is defined as a first solution. In the embodiments of the present disclosure, except that the third part is disposed in the same layer as one of the first sub-part and the second sub-part, the first sub-part is connected to the second sub-part at the junction of the hole-digging area and the display area, the third sub-part is connected to the fourth sub-part, and the first sub-part is connected to the third sub-part through the third part, and other solutions with the same design as the current display device is defined as a second solution. In the embodiments of the present disclosure, except that the third part includes a fifth subpart and a sixth subpart disposed in the same layer as the first sub-part and the second sub-part, respectively, the first sub-part is connected to the third sub-part through the fifth sub-part, and the second sub-part is connected to the fourth sub-part through the sixth sub-part, other solutions with the same design as the current display device is defined as a third solution.

Specifically, simulation results show that in the first solution, light-emitting currents of from a first pixel, a second pixel and a third pixel in a direction away from the first gate driving unit to a direction adjacent to the first gate driving unit are 950.5 picoamperes, 939.5 picoamperes, and 895.4 picoamperes, respectively. In the second solution, light-emitting currents from the first pixel to the third pixel in the direction away from the first gate driving unit to the direction adjacent to the first gate driving unit are 976 picoamperes, 981 picoamperes, and 902 picoamperes, respectively. In the third solution, light emitting currents from the first pixel to the third pixel in the direction away from the first gate driving unit to the direction adjacent to the first gate driving unit are 975.4 picoamperes, 986.7 picoamperes, and 900.9 picoamperes, respectively. The light-emitting currents of the pixels in other areas are similar or even consistent with the light-emitting currents of the third solution. It may be seen that the light-emitting currents of the pixels corresponding to the O-cut area in the current display device are inconsistent with the light-emitting currents of the pixels in other areas, resulting in uneven display. However, the present disclosure may make the light-emitting currents of the pixels corresponding to the hole-digging area similar or even consistent with the light-emitting currents of the pixels in other areas, thereby improving the display effects.

In some embodiments, as illustrated in FIG. 1, the first initialization transistor T4 is connected to the first initialization signal line Vi1.

In some embodiments, as illustrated in FIG. 1, a gate of the switching transistor T2 is connected to a third scanning signal line Pscan1, and a first electrode of the switching transistor T2 is connected to a data signal line Data.

In some embodiments, as illustrated in FIG. 1, the pixel driving circuit further includes a second initialization transistor T7, a first light-emitting controlling transistor T5, a second light-emitting controlling transistor T6, and a third light-emitting controlling transistor T8. A first electrode of the second initialization transistor T7 is connected to a second initialization signal line Vi2. A second electrode of the second initialization transistor T7 is connected to the light-emitting device LED at a fourth node C. A gate of the second initialization transistor T7 is connected to the fourth scanning signal line Pscan2.

The first light-emitting controlling transistor T5 is connected to the driving transistor T1 through the first node A. The first light-emitting controlling transistor T5 is connected to a light-emitting controlling signal line EM. The second light-emitting controlling transistor T6 is connected to the driving transistor T1 through the second node B. The third light-emitting controlling transistor T8 is connected to a third initialization signal line Vi3.

In some embodiments, as illustrated in FIG. 1, the light-emitting device LED is connected to a low potential power signal line VSS.

In some embodiments, as illustrated in FIG. 1, the pixel driving circuit further includes a storage capacitor Cst and a boosting capacitor Cboost. One terminal of the storage capacitor Cst is connected to a high potential power signal line VDD, and the other terminal of the storage capacitor Cst is connected to the third node Q. One terminal of the boost capacitor Cboost is connected to the gate of the switching transistor T2, and the other terminal of the boost capacitor Cboost is connected to the third node Q.

Specifically, as illustrated in FIG. 14, the gate driving units 41 further include third gate driving units 413, fourth gate driving units 414, and fifth gate driving units 415. Two adjacent rows of light-emitting controlling signal lines 33 are connected to a same one of the third gate driving units 413, the third scanning signal line 34 in one row is connected to two fourth gate driving units, and the fourth scanning signal lines 35 in two adjacent rows are connected to a same one of the fifth gate driving units.

Specifically, as illustrated in FIG. 14 and FIG. 15, the first light-emitting controlling transistor T5 and the second light-emitting controlling transistor T6 are controlled by the light-emitting controlling signal line EM. The compensation transistor T3 is controlled by the first scanning signal line Nscan1. The first initialization transistor T4 is controlled by the second scanning signal line Nscan2. The switching transistor T2 is controlled by the third scanning signal line Pscan1. The second initialization transistor T7 and the third initialization transistor T8 are controlled by the fourth scanning signal line Pscan2, thereby realizing normal operation of the display panel.

In some embodiments, as illustrated in FIG. 3, the display panel further includes a light shielding layer 22, a buffer layer 23, a first gate insulating layer 242, a second gate insulating layer 244, a third gate insulating layer 246, a fourth gate insulating layer 248, a first interlayer insulating layer 251, the first source/drain layer 252, a second interlayer insulating layer 253, a second source/drain layer 254, a third interlayer insulating layer 255, a third source/drain layer 256, a planarization layer 257, a pixel electrode layer 261, a pixel defining layer 262, a light-emitting material layer 263, a common electrode layer 264, and a packaging layer 27.

Specifically, the design of the first scanning signal line and the design of the second scanning signal line are respectively described in the above-mentioned embodiments. It may be understood that when there is no conflict among the embodiments, the embodiments may be combined to achieve better effects. For example, the third part includes the fifth sub-part disposed in the same layer as the first sub-part and the sixth sub-part disposed in the same layer as the second sub-part, the first sub-part is connected to the third sub-part through the fifth sub-part, and the second sub-part is connected to the fourth sub-part through the sixth sub-part. After the left-side parts of the adjacent two rows of the second scanning signal lines are connected, the left-side parts of the adjacent two rows of the second scanning signal lines are connected to the right-side parts of the adjacent two rows of the second scanning signal lines through the same wiring. For example, the third part includes the fifth sub-part disposed in the same layer as the first sub-part and the sixth sub-part disposed in the same layer as the second sub-part, the first sub-part is connected to the third sub-part through the fifth sub-part, and the second sub-part is connected to the fourth sub-part through the sixth sub-part. The sixth part includes the eleventh sub-part disposed in the same layer as the seventh sub-part and the twelfth sub-part disposed in the same layer as the eighth sub-part, the seventh sub-part is connected to the ninth sub-part through the eleventh sub-part, and the eighth sub-part is connected to the tenth sub-part through the twelfth sub-part.

Furthermore, a display device is provided by the embodiments of the present disclosure. The display device includes the display panel as described in any one of the above embodiments.

According to the above embodiments:

The display panel and the display device are provided by the present disclosure. The display panel includes the display area and the hole-digging area. The display area is disposed surrounding the display area. The display panel includes a plurality of first scanning signal lines. The plurality of first scanning signal lines include a plurality of first type scanning signal lines. Each of the first type scanning signal lines includes a first part, a second part, and a third part. The first part and the second part are respectively located on opposite two sides of the hole-digging area and extend along a first direction. The third part is connected between the first part and the second part. An extension line of the first part passes through the hole-digging area. A unit length impedance of the third part is greater than a unit length impedance of the first part and a unit length impedance of the second part. In the present disclosure, with the configuration that the first part and the second part of the part of the first type scanning signal line are connected through the third part, each first type scanning signal line bypasses the hole-digging area from the left side to the right side of the hole-digging area alone, and an impedance of the first scanning signal line bypassing the hole-digging area is similar to or even consistent with to an impedance of the first scanning signal line in other areas. Therefore, the load of a hole-digging area is similar or even consistent with the load of other areas, thereby improving the display effects.

In the foregoing embodiments, the description of each of the embodiments has respective focuses. For a portion that is not described in detail in an embodiment, reference may be made to relevant descriptions in other embodiments. Details are not further described herein.

The display panel and the display device provided by the embodiments of the present disclosure are described in detail above, and the principle and implementation mode of the present disclosure are described by using specific examples in this paper. The description about the foregoing embodiments is merely provided to help understand the method and core ideas of the present disclosure. In addition, persons of ordinary skill in the art can make modifications in terms of the specific implementations and application scopes according to the ideas of the present disclosure. Therefore, the content of this specification shall not be construed as a limit to the present disclosure.

What is claimed is:

1. A display panel, comprising a display area and a hole-digging area surrounded by the display area;

wherein the display panel comprises a plurality of first scanning signal lines, the plurality of first scanning signal lines comprise a plurality of first type scanning signal lines, each of the plurality of first type scanning signal lines comprises a first part, a second part, and a third part, the first part and the second part are respectively located on opposite two sides of the hole-digging area and extend along a first direction, the third part is connected between the first part and the second part, and an extension line of the first part passes through the hole-digging area;

wherein a unit length impedance of the third part is greater than a unit length impedance of the first part and a unit length impedance of the second part;

wherein the display panel further comprises:

a substrate;

a first active layer disposed on a side of the substrate;

a first metal layer disposed on a side of the first active layer away from the substrate;

a second metal layer disposed on a side of the first metal layer away from the first active layer;

a second active layer disposed on a side of the second metal layer away from the first metal layer; and a third metal layer disposed on a side of the second active layer away from the second metal layer; and wherein the third part is disposed in at least one of the first metal layer, the second metal layer, and the third metal layer.

2. The display panel according to claim 1, wherein a line width of the third part is less than a line width of the first part and a line width of the second part.

3. The display panel according to claim 2, wherein the plurality of first scanning signal lines further comprise a plurality of second type scanning signal lines extending along the first direction, and the line width of the third part is less than a line width of each of the plurality of second type scanning signal lines.

4. The display panel according to claim 1, wherein the first part comprises a first sub-part and a second sub-part located in different layers respectively, the second part comprises a third sub-part disposed in a same layer as the first sub-part and a fourth sub-part disposed in a same layer as the second sub-part, and the first sub-part and the second sub-part are respectively connected to the third sub-part and the fourth sub-part through the third part.

5. The display panel according to claim 4, wherein the third part and one of the first sub-part and the second sub-part are disposed in a same layer, at a junction of the hole-digging area and the display area, the first sub-part is connected to the second sub-part, the third sub-part is connected to the fourth sub-part, and the first sub-part is connected to the third sub-part through the third part; and wherein the line width of the third part is less than a line width of the first sub-part or the second sub-part disposed in the same layer as the third part, and the line width of the third part is less than a line width of the third sub-part or the fourth sub-part disposed in the same layer as the third part.

6. The display panel according to claim 5, wherein the display panel further comprises a first connecting part, the first connecting part is connected to the third part through one via hole, and the first connecting part is connected to the second sub-part through another via hole.

7. The display panel according to claim 1, wherein the third part comprises a fifth sub-part disposed in a same layer as the first sub-part and a sixth sub-part disposed in a same layer as the second sub-part, the first sub-part is connected to the third sub-part through the fifth sub-part, and the second sub-part is connected to the fourth sub-part through the sixth sub-part; and wherein a line width of the fifth sub-part and a line width of the sixth sub-part are less than the line width of the first sub-part and the line width of the third sub-part.

8. The display panel according to claim 7, wherein the fifth sub-part is disposed in the first metal layer, and the sixth sub-part is disposed in the second metal layer; or the fifth sub-part is disposed in the first metal layer, and the sixth sub-part is disposed in the third metal layer; or the fifth sub-part is disposed in the second metal layer, and the sixth sub-part is disposed in the third metal layer.

9. The display panel according to claim 1, wherein the display panel comprises a plurality of second scanning signal lines, the plurality of second scanning signal lines comprise a plurality of third type scanning signal lines, each of the plurality of third type scanning signal lines comprises a fourth part, a fifth part, and a sixth part, the fourth part and the fifth part are respectively located on the opposite two sides of the hole-digging area and extend along the first direction, the sixth part is connected between the fourth part and the fifth part, and an extension line of the fourth part passes through the hole-digging area; and wherein a unit length impedance of the sixth part is greater than a unit length impedance of the fourth part and a unit length impedance of the fifth part.

10. The display panel according to claim 9, wherein a line width of the sixth part is less than a line width of the fourth part and a line width of the fifth part.

11. The display panel according to claim 10, wherein the plurality of second scanning signal lines further comprise a plurality of fourth type scanning signal lines extending along the first direction, and the line width of the sixth part is less than a line width of each of the plurality of fourth type scanning signal lines.

12. The display panel according to claim 9, wherein the fourth part comprises a seventh sub-part and an eighth sub-part located in different metal layers respectively, the fifth part comprises a ninth sub-part disposed in a same layer as the seventh sub-part and a tenth sub-part disposed in a same layer as the eighth sub-part, and the seventh sub-part and the eighth sub-part are respectively connected to the ninth sub-part and the tenth sub-part through the sixth part.

13. The display panel according to claim 12, wherein the sixth part and one of the seventh sub-part and the eighth sub-part are disposed in a same layer, at a junction of the hole-digging area and the display area, the seventh sub-part is connected to the eighth sub-part, the ninth sub-part is connected to the tenth sub-part, and the seventh sub-part is connected to the ninth sub-part through the sixth part; and wherein the line width of the sixth part is less than a line width of the seventh sub-part or the eighth sub-part disposed in the same layer as the sixth part, and the line width of the sixth part is less than a line width of the ninth sub-part or the tenth sub-part disposed in the same layer as the sixth part.

14. The display panel according to claim 13, wherein the display panel further comprises a second connecting part, the second connecting part is connected to the sixth part through one via hole, and the second connecting part is connected to the eighth sub-part through another via hole.

15. The display panel according to claim 12, wherein the sixth part comprises an eleventh sub-part disposed in a same layer as the seventh sub-part and a twelfth sub-part disposed in a same layer as the eighth sub-part, the seventh sub-part is connected to the ninth sub-part through the eleventh sub-part, and the eighth sub-part is connected to the tenth sub-part through the twelfth sub-part; and wherein a line width of the eleventh sub-part and a line width of the twelfth sub-part are less than the line width of the seventh sub-part and the line width of the ninth sub-part.

16. The display panel according to claim 15, wherein the eleventh sub-part is disposed in the first metal layer, and the twelfth sub-part is disposed in the second metal layer; or the eleventh sub-part is disposed in the first metal layer, and the twelfth sub-part is disposed in the third metal layer; or the eleventh sub-part is disposed in the second metal layer, and the twelfth sub-part is disposed in the third metal layer.

17. The display panel according to claim 9, wherein the display panel comprises a plurality of light-emitting devices arranged in an array and a pixel driving circuit driving the plurality of light-emitting devices, and the pixel driving circuit comprises:

a driving transistor;

a switching transistor connected to the driving transistor at a first node;

a compensation transistor connected to a corresponding one of the plurality of first scanning signal lines, wherein the compensation transistor, the driving transistor, and a corresponding one of the plurality of light-emitting devices are connected at a second node; and a first initialization transistor connected to a corresponding one of the plurality of second scanning signal lines, wherein the first initialization transistor, the driving transistor, and the compensation transistor are connected at a third node.

18. The display panel according to claim 17, wherein the display panel further includes a plurality of gate driving units, the plurality of gate driving units comprise first gate driving units and second gate driving units arranged the opposite two sides of the display area, two adjacent rows of the plurality of first scanning signal lines are connected to a same one of the first gate driving units, and two adjacent rows of the plurality of second scanning signal lines are connected to a same one of the second gate driving units.

19. A display device, comprising a display panel, wherein the display panel comprises a display area and a hole-digging area surrounded by the display area;

wherein the display panel comprises a plurality of first scanning signal lines, the plurality of first scanning signal lines comprise a plurality of first type scanning signal lines, each of the plurality of first type scanning signal lines comprises a first part, a second part, and a third part, the first part and the second part are respectively located on opposite two sides of the hole-digging area and extend along a first direction, the third part is connected between the first part and the second part, and an extension line of the first part passes through the hole-digging area;

wherein a unit length impedance of the third part is greater than a unit length impedance of the first part and a unit length impedance of the second part;

wherein the display panel further comprises:

a substrate;

a first active layer disposed on a side of the substrate;

a first metal layer disposed on a side of the first active layer away from the substrate;

a second metal layer disposed on a side of the first metal layer away from the first active layer;

a second active layer disposed on a side of the second metal layer away from the first metal layer; and a third metal layer disposed on a side of the second active layer away from the second metal layer; and wherein the third part is disposed in at least one of the first metal layer, the second metal layer, and the third metal layer.

* * * * *